(12) United States Patent
Goodon et al.

(10) Patent No.: US 10,394,209 B2
(45) Date of Patent: Aug. 27, 2019

(54) ELECTRIC MOTOR ADDRESSING FOR PLANTERS

(71) Applicant: AGCO Corporation, Hesston, KS (US)

(72) Inventors: Matthew D. Goodon, Hesston, KS (US); Monte J. Rans, Hesston, KS (US); Paul M. Scott, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 240 days.

(21) Appl. No.: 15/516,202

(22) PCT Filed: Sep. 18, 2015

(86) PCT No.: PCT/US2015/050907
§ 371 (c)(1),
(2) Date: Mar. 31, 2017

(87) PCT Pub. No.: WO2016/060785
PCT Pub. Date: Apr. 21, 2016

(65) Prior Publication Data
US 2017/0293277 A1 Oct. 12, 2017

Related U.S. Application Data

(60) Provisional application No. 62/063,041, filed on Oct. 13, 2014.

(51) Int. Cl.
*H04L 29/12* (2006.01)
*G05B 19/042* (2006.01)
*H04L 12/413* (2006.01)

(52) U.S. Cl.
CPC ........ *G05B 19/042* (2013.01); *H04L 12/4135* (2013.01); *H04L 61/2038* (2013.01);
(Continued)

(58) Field of Classification Search
CPC ........ G05B 10/042; G05B 2219/25096; G05B 2219/25032; G05B 2219/21081;
(Continued)

(56) References Cited

U.S. PATENT DOCUMENTS 5,884,205 A     3/1999  Elmore et al.
6,091,997 A *   7/2000  Flamme ............... A01B 79/005
                                                 111/903

(Continued)

FOREIGN PATENT DOCUMENTS

CN     101557328 A    10/2009
DE    102010033545 A1  2/2012

OTHER PUBLICATIONS

Qingmei et al.; The Design of Communication Nodes in the Tractor Control Network Based on ISO11783 Protocol; 2010 Intl. Conf. on Intelligent Computation Tech. and Automation; Changsha; IEEE, pp. 772-775 (Year: 2010).*

(Continued)

*Primary Examiner* — Michael J Zanelli

(57) ABSTRACT

An electric motor addressing system and method for a planter implement receives, at an electronic control unit (ECU), an address claim request from each motor of a plurality of motors coupled to the ECU via a first bus. Each address claim request includes a requested bus address and a binary value corresponding to a pin connector setting associated with a harness connector of the respective motor. The system associates the binary value with a physical address for each motor without reference to the bus address and maps each bus address to the physical address.

18 Claims, 4 Drawing Sheets

(52) U.S. Cl.
CPC .............. *G05B 2219/21069* (2013.01); *G05B 2219/21081* (2013.01); *G05B 2219/25032* (2013.01); *G05B 2219/25096* (2013.01); *H04L 61/6027* (2013.01)

(58) Field of Classification Search
CPC ...... G05B 2219/21069; H04L 61/2038; H04L 61/6027; H04L 12/4135
See application file for complete search history.

(56) References Cited

U.S. PATENT DOCUMENTS

| | | |
|---|---|---|
| 6,291,770 B1 | 9/2001 | Casperson |
| 2005/0017581 A1 | 1/2005 | Kelwaski |
| 2008/0306663 A1* | 12/2008 | Warner ................ B60W 50/04 701/50 |
| 2009/0327540 A1* | 12/2009 | Robertson ........... G06F 13/4226 710/104 |
| 2011/0222433 A1* | 9/2011 | Jones ................ H04L 29/12254 370/254 |
| 2012/0020401 A1 | 1/2012 | Itou et al. |
| 2013/0238200 A1 | 9/2013 | Woodcock |

OTHER PUBLICATIONS

Markus Junger, Introduction to J1939, Ver 1.1, dated Apr. 27, 2010, published @ http://vector.com/portal/medien/cmc/application_notes/AN-ION-1-3100_Introduction_to_J1939.pdf, dat.

Marvin Stone, SAE J1939 / ISO 11783 Tractor ECU, Lecture 7 Tractor ECU, ISO 11783 Part 9, BAE 5030—353 Spring 2009, Biosystems and Agricultural Engineering, Oklahoma State University.

UK Intenllectual Property Office, International Search report for related UK Application No. GB1508043.5, dated Nov. 20, 2015.

European Patent Office, International Search Report for Parent International Application No. PCT/US2015/050907, dated Feb. 15, 2016.

* cited by examiner

ELECTRIC MOTOR ADDRESSING FOR PLANTERS

CROSS REFERENCE TO RELATED APPLICATION

This application claims the benefit of U.S. Provisional Application No. 62/063,041, entitled ELECTRIC MOTOR ADDRESSING FOR PLANTERS and filed Oct. 13, 2014.

BACKGROUND OF THE INVENTION

Field of Invention

The present disclosure is generally related to agricultural machines, and, more particularly, to electric motor addressing for planters.

Description of Related Art

Machines used in the agricultural industry have evolved in electronic capabilities over the years from simple lighting systems to a complex array of electronic control units (ECUs) and other devices that enable machine and implement diagnostics, position detection, ground speed and heading determination, telemetry, and precision farming. For instance, combine harvester movement during harvesting operations may be autonomously (or semi-autonomously) guided along waylines using an automated steering system in coordination with an electrically coupled, on-board Global Navigation Satellite System (GNSS) receiver. Towed implements, such as planter implements, may comprise motors and/or other devices that communicate with, and are controlled by, an ECU to perform such functions as delivering seeds at an optimum seeding rate for a given area of the field based on a network-accessed or an internally stored topographic map. Such complex systems typically involve various hardware and/or software, as well as a communication medium or network to relay control signals and the corresponding messages.

For years, agricultural systems have used a complex of wiring (e.g., wiring harnesses) that convey signals between devices under one or more communication standards, such as RS 232 for serial communications, and/or proprietary communication protocols. More recently, the Society of Automotive Engineers (SAE) J1939 standard has been used, as further extended under ISO11783 for defining serial communication between tractor and implements on an implement bus (which adds services on the application layer, such as the virtual terminal, tractor ECU, task controller, and file server). In general, J1939 is a seven-layer communications network that enables peer-to-peer communication of ECUs and/or other devices on the network. J1939 uses a Controller Area Network (CAN ISO11998) as a physical layer, and defines which and how data is communicated between ECUs and/or devices within a machine network. For instance, each device or "node" on the network is associated with an ECU that monitors the network for messages that are required to perform the various machine functions. Messages have a unique identifier at the beginning so that the ECU or device at each node can determine if the message is one it uses or whether it should ignore the message.

One mechanism for identifying each device on the network includes bus address arbitration, referred to as an address claiming procedure. For instance, when a device (e.g., a motor among a row of motors on a planter implement) requests an address, an RQST (request address) message may be sent without an address attached to it. All other devices respond with their claimed address, and the requesting device then sends another RQST message, only this time with an address attached. If for some reason, this address conflicts with another devices claimed address, that conflicting device will send out again its address claim information on the bus and the (requesting) device will then try a different address. In some cases, some devices skip the first step and merely try to claim an address, which may or may not conflict. J1939 address claiming does not guarantee the same address for each device each time the bus address claiming procedure is performed, with the result that the physical address cannot be relied on to indicate the job function/location.

Overview of the Invention

In one embodiment, a method comprising receiving, at an electronic control unit (ECU), an address claim request from each motor of a plurality of motors coupled to the ECU via a first bus, each address claim request comprising a requested bus address and a binary value corresponding to a pin connector setting associated with a harness connector of the respective motor; associating the binary value with a physical address for each motor without reference to the bus address; and mapping each bus address to the physical address.

Another aspect of the invention is directed to a system including a wire harness comprising a plurality of connectors. Each connector having a unique pin connector value, the wire harness providing a data bus for data communications. The system includes a plurality of devices coupled respectively to the plurality of connectors, each device comprising circuitry that can read the respective pin connector value and communicate the respective pin connector value over the data bus. The system includes an electronic control unit (ECU) coupled to the plurality of devices via the wire harness. The ECU is configured to receive an address claim request over the data bus from at least one of the devices, the address claim request comprising the associated pin connector value and a bus address. The ECU associates the pin connector value to a physical address of the at least one of the devices and maps the bus address to the physical address. The ECU communicates with the at least one of the devices over the data bus based on the physical address. In one embodiment, the data bus comprises a controller area network (CAN) bus and the address claim request comprises a J1939 address claim.

These and other features and advantages of this invention are described in, or are apparent from, the following detailed description of various exemplary embodiments of the systems and methods according to this invention.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Corresponding reference characters indicate corresponding parts throughout the views of the drawings.

DESCRIPTION OF EXAMPLE EMBODIMENTS

Figure 1:
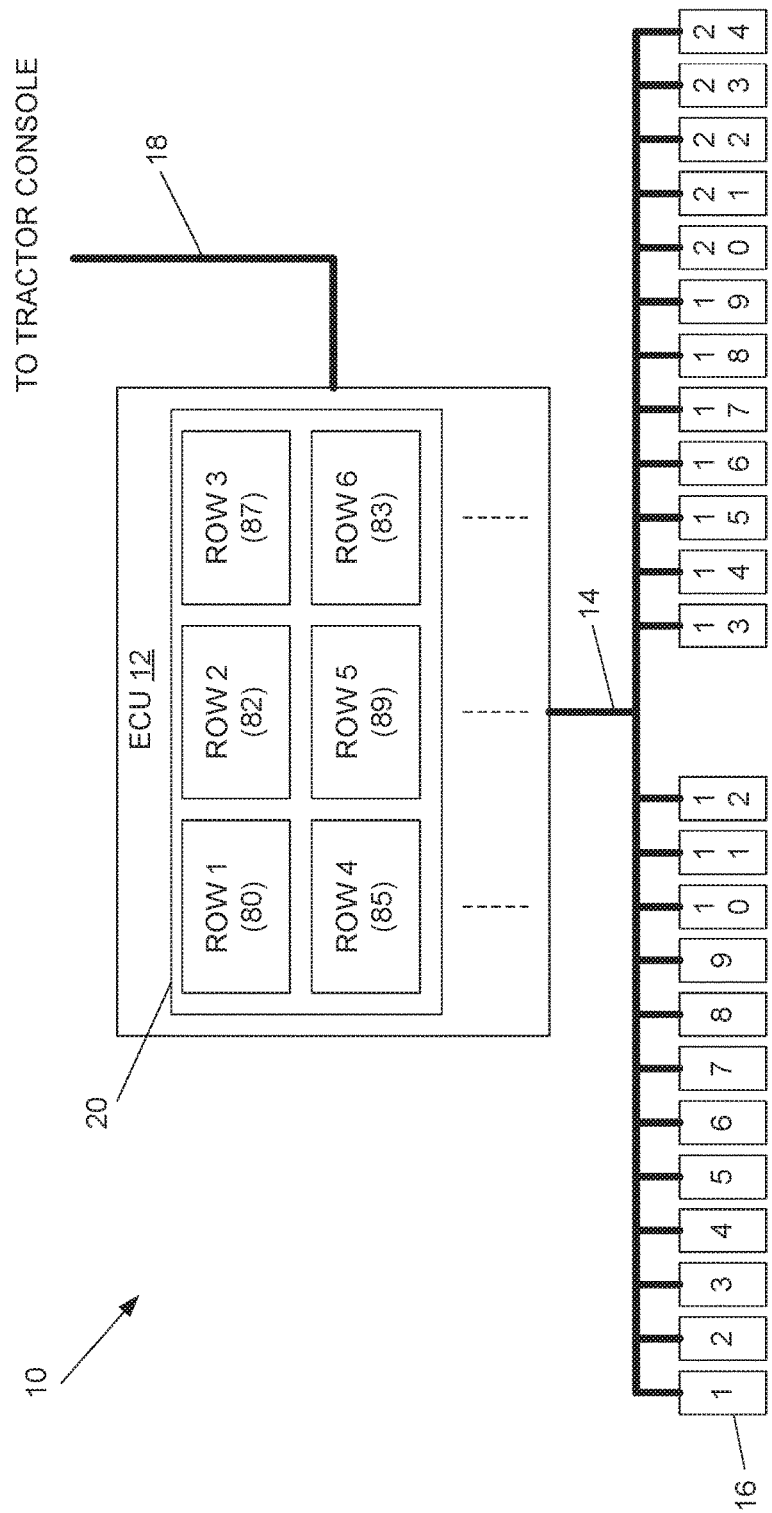
FIG. 1 is a schematic diagram that illustrates an embodiment of an example electric motor addressing system.

Certain embodiments of an electric motor addressing system and method for a planter implement are disclosed that, in the process of address claim requests according to the J1939 standard, map a physical address to an arbitrated bus address for each motor without interfering with or modifying the J1939 bus arbitration. In one embodiment, each motor is coupled to a respective connector of a wire harness that also couples to an electronic control unit (ECU). Each motor comprises electronics (e.g., node electronics) that read a predetermined configuration of pins (e.g., a combination of open and closed pins) of the connector that couples the motor to the harness. The motor electronics interpret the configuration of pins as a binary number, and include the binary number in a previously unused or minimally used data field of a J1939 address claim request. The ECU forms a physical address from each received binary number and maps the physical address to the arbitrated bus address. Notably, the arbitration proceeds unaffected by the binary number.

Digressing briefly, standard J1939 address claiming does not guarantee the same address for components each time an address claim is performed. Thus, motor addresses cannot be used to indicate a location or job function. By using digital inputs from the wire harness without interrupting or modifying the address claiming procedure of J1939, the ECU can determine the job function and location of each motor regardless of switch-outs among the motors, power interruption that might alter the bus address, and further maintain integrity and uniqueness in address claiming in communications among the motors and the ECU where legacy devices are involved.

Having summarized certain features of electric motor addressing systems of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, one focus is on an agricultural machine embodied as a planter with a plurality of rows of motors. However, it should be appreciated that some embodiments of electric motor addressing systems may be used anywhere that a physical location of a device (e.g., motor, sensor, and/or other devices) on a J1939 Controller Area Network (CAN) bus needs to be mapped to a bus address. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set forth in the description.

Referring now to FIG. 1, shown is a schematic diagram that illustrates an embodiment of an example electric motor addressing system 10. It should be appreciated by one having ordinary skill in the art, in the context of the present disclosure, that the example electric motor addressing system 10 is merely illustrative, and that in some embodiments, other configurations and/or machines or devices may be used. In one embodiment, the electric motor addressing system 10 comprises an electronic control unit (ECU) 12 coupled to a wire harness 14. In one embodiment, the wire harness 14 is logically configured as a data bus, such as a controller area network (CAN) bus. In the depicted embodiment, the wire harness 14 is coupled to a plurality of electric motors 16 numbered in this example as rows 1-24, though the quantity of rows may be different in some embodiments. The ECU 12 is also coupled via a wire harness 18, which in turn couples to other devices not shown, such as a tractor console or virtual terminal. The wire harness 18 may likewise be logically configured as a data bus, such as a CAN bus embodied as a well-known ISO Bus. Note that herein wire harnesses 14 and 18 are used interchangeably with buses. Each wire harness 14 and 18 comprises a plurality of terminations embodied, in significant part, as a respective (multi-pin) connector that facilitates communications according to the J1939 standard. As described further below, each connector of the harness 14 that receives a motor 16 comprises a plurality of pins with a preconfigured number of open and closed pins that represent a unique (unique relative to other connectors of the harness 14) digital input or signature.

The ECU 12 comprises, among other components, memory 20, which may include a data structure (e.g., look-up table, or LUT) that maps a physical address (e.g., row) of each motor 16 to a bus address that is arbitrated according to J1939. For instance, programming at the manufacturer and/or via a start-up configuration (e.g., in the field) associates the harness connectors (and pin configuration) with a physical address or location along a planter implement. Upon receiving the binary number corresponding to the connector pin configuration in an address claim request, the ECU 12 recognizes the location (e.g., through prior, pre-programmed association), enabling a mapping of an arbitrated bus address for each motor with the respective physical address. In the depicted example, the memory 20 shows row 1 (motor 1) mapped to arbitrated bus address 80, row 2 (motor 2) mapped to arbitrated bus address 82, and so on for the other motors (not all mapping shown in FIG. 1). The manner in which mapping is achieved is described further below. Note that the motors 16 may be replaced with, or supplemented with, other devices, such as accelerometers, level sensors, among other sensors or devices.

In one embodiment, the electric motors 16 may be arranged on a towed, planter implement, and the tractor console may be associated with a towing vehicle, such as a tractor. In one embodiment, the motors 16 may be used in a seed dispensing application. For instance, as the planter implement moves across a field (e.g., as towed by a towing vehicle), the tractor console may provide the ECU 12 with information, such as the rate and/or zone in which the tractor is operating. The ECU 12 may also receive information from other devices, such as the speed of the tractor (e.g., via a radar device, or a global positioning system (GPS) receiver). The ECU 12 computes, based on the information, the quantity of seeds per acre to dispense for the zone the tractor is traveling in, and then signals one or more of the motors 16 to cause an associated seed dispenser to increase or decrease the rate of seed dispersal. The mapping of the bus address to the physical address enables selective activation of a given row or rows, such as for use in precision farming.

Figure 2:
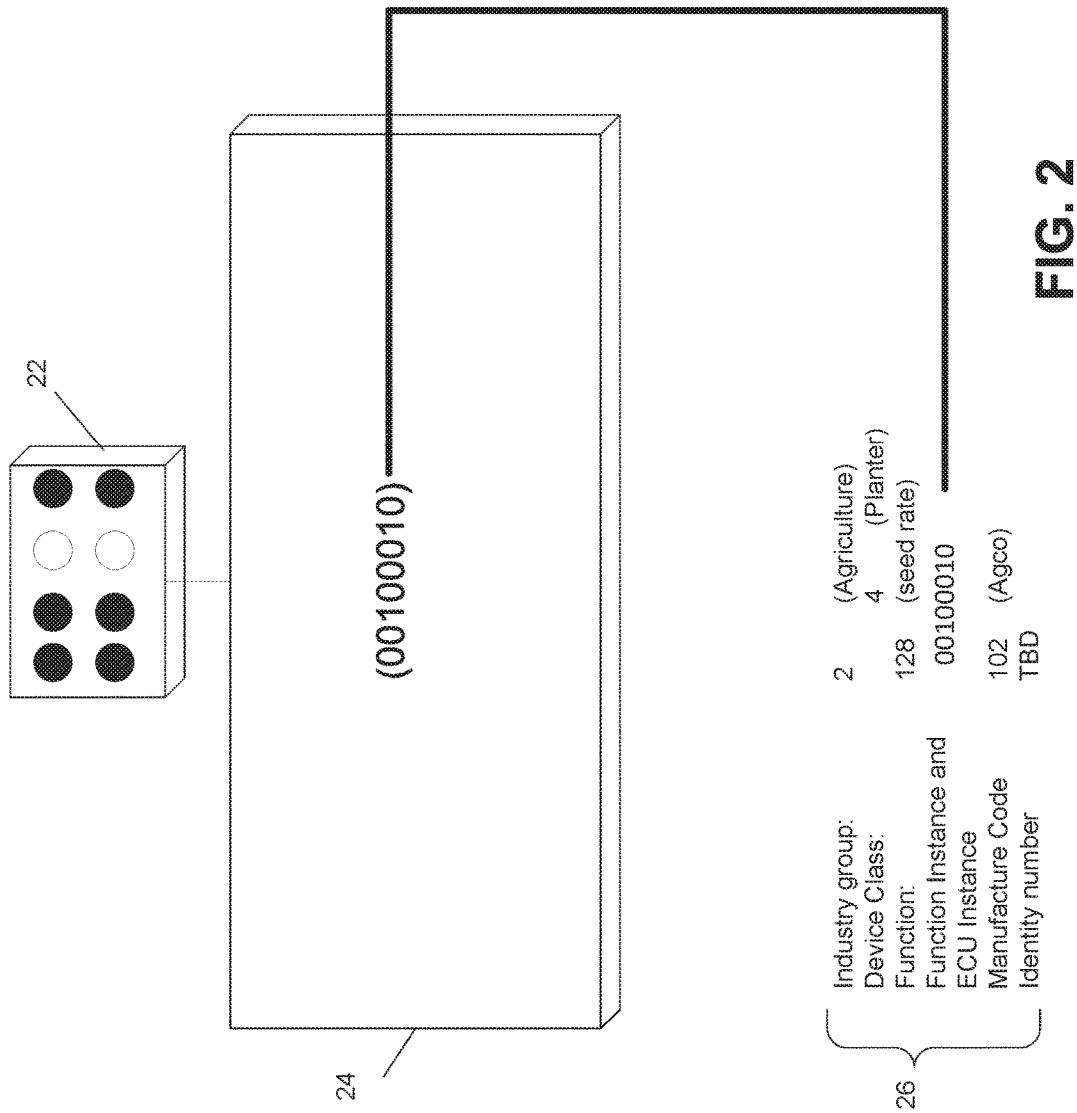
FIG. 2 is a schematic diagram that conceptually illustrates an embodiment of an example electric motor addressing method.

Referring now to FIG. 2, shown is a schematic diagram that conceptually illustrates an embodiment of an example motor addressing method. A well-known harness plug or connector 22 is schematically shown with eight (8) pins, though it should be appreciated that the harness connector 22 may include additional or fewer pins in some embodiments. As indicated above, a predetermined combination of the pins are either grounded (e.g., to the implement planter frame) or left open (e.g., at a supply voltage level or variant thereof) to provide a unique digital signature. In this example, six (6) of the pins (dark-filled) are of one configuration (e.g., grounded or open-voltage) and two (2) of the pins (white-filled) are of another configuration (e.g., grounded or open-voltage). Upon boot up or reset, motor electronics 24 read the harness pins and interpret the digital inputs to form a binary number based on the read harness pins (e.g., 00100010). The motor electronics 24 (also referred to herein as control circuitry or node electronics) form an address claim request message according to J1939. Node electronics (including the motor electronics 24) generally include any known arrangement of logic gates, registers, memory, and/or software (including firmware) that are configured to read external digital inputs, arbitrate a J1939 address, and communicate on a J1939 CAN bus for a motor or other devices, such as sensors, etc. As is known, address claim data 26 according to J1939 comprises plural fields (e.g., NAME fields), including an industry group, device class, function, function instance and ECU instance, manufacture code, and identity number. In the process of forming the message in one embodiment of an electric motor addressing system 10 (FIG. 1), the motor electronics 24 of the motors 16 (FIG. 1) populate the data field (e.g., byte-field) corresponding to the function instance (5 bits) and ECU instance (3 bits) with the binary number read from, or derived by, the input pins of the connector 22. The motor electronics 24 broadcast (or in some embodiments, selectively transmit or unicast) the address claim request message as part of an arbitration process performed among the other motors 16 (e.g., motor electronics), and the ECU 12 (FIG. 1) receives and parses the messages from the motors 16. The ECU 12 further associates the binary numbers from each motor 16 with the corresponding physical address (e.g., row), and maps each arbitrated bus address with the corresponding physical address.

Figure 3:
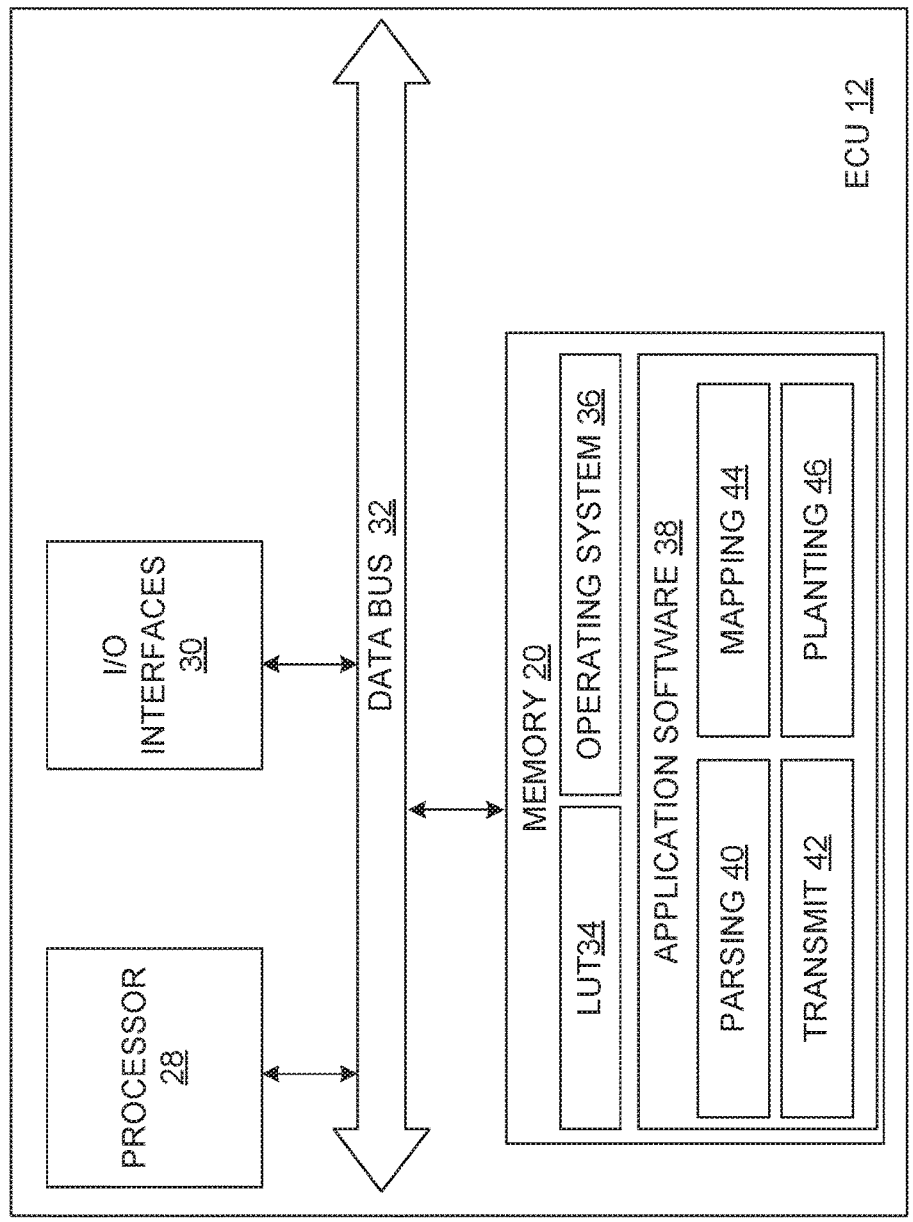
FIG. 3 is a block diagram that illustrates an embodiment of an example electronic control unit (ECU) of an example electric motor addressing system.

Referring now to FIG. 3, shown is one embodiment of an example ECU 12. One having ordinary skill in the art should appreciate in the context of the present disclosure that the example ECU 12 is merely illustrative, and that some embodiments of ECUs may comprise fewer or additional components, and/or some of the functionality associated with the various components depicted in FIG. 3 may be combined, or further distributed among additional modules, in some embodiments. The ECU 12 is depicted in this example as having a computer architecture, but may be embodied as a programmable logic controller (PLC), FPGA, ASIC, among other devices. It should be appreciated that certain well-known components of computers are omitted here to avoid obfuscating relevant features of the ECU 12. In one embodiment, the ECU 12 comprises one or more processors, such as processor 28, input/output (I/O) interface(s) 30, and memory 20, all coupled internally to one or more data busses, such as data bus 32. The memory 20 may include any one or a combination of volatile memory elements (e.g., random-access memory RAM, such as DRAM, and SRAM, etc.) and nonvolatile memory elements (e.g., ROM, hard drive, tape, CDROM, etc.). The memory 20 may store a native operating system, one or more native applications, emulation systems, or emulated applications for any of a variety of operating systems and/or emulated hardware platforms, emulated operating systems, etc. In some embodiments, the memory 20 may include one or more look-up tables (LUTs) 34 that map the physical locations of the harness connectors 22 (FIG. 2) to each unique pin connector configuration, and for each motor 16, also maps the arbitrated bus address received in an address claim request to the pin connector configuration (e.g., binary number) also received in the address claim request. In the embodiment depicted in FIG. 3, the memory 20 further comprises an operating system 36, and application software 38.

In one embodiment, the application software 38 comprises parsing software 40 to parse each of the fields of each address claim request message among other messages, transmit software 42 to format and generally enable communications over each bus 14 and 18, mapping software 44 to map the arbitrated bus addresses with corresponding physical addresses, and planting software 48 to determine a seed rate based on one or more inputs, and provide selective motor speed control to enable precision seed dispensing rates at desired field locations. It should be appreciated that in some embodiments, additional or fewer software modules (e.g., combined functionality) may be employed in the memory 20 or additional memory, such as a BIOS for providing boot-up functionality. In some embodiments, a separate storage device may be coupled to the data bus 32, such as a persistent memory (e.g., optical, magnetic, and/or semiconductor memory and associated drives).

Execution of the application software 38 may be implemented by the respective processor 28 under the management and/or control of the operating system 36. The processor 28 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the ECU 12.

The I/O interfaces 30 may comprise any number of interfaces for the input and output of signals (e.g., analog or digital data) for conveyance of information (e.g., data) over the buses 14 and/or 18. The input may comprise data over the buses 14 and/or 18, including input by an operator or device (e.g., radar, GPS, sensors, other ECUs, etc.).

When certain embodiments of the ECU 12 are implemented at least in part as software (including firmware), as depicted for instance in FIG. 3, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the ECU 12 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
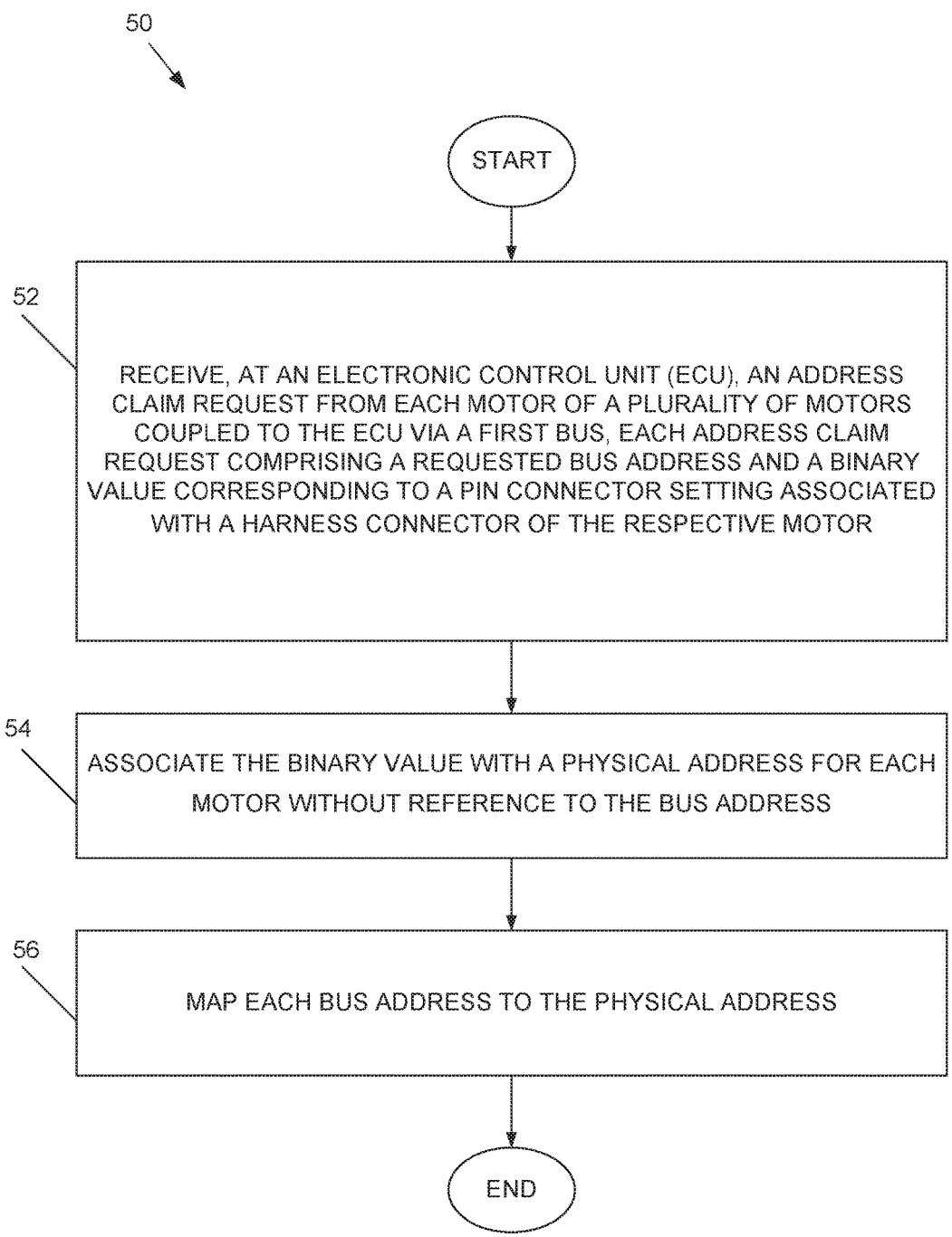
FIG. 4 is a flow diagram that illustrates an embodiment of an example electric motor addressing method.

In view of the above description, it should be appreciated that one embodiment of an example electric motor addressing method 50, depicted in FIG. 4, comprises receiving, at an electronic control unit (ECU), an address claim request from each motor of a plurality of motors coupled to the ECU via a first bus, each address claim request comprising a requested bus address and a binary value corresponding to a pin connector setting associated with a harness connector of the respective motor (52); associating the binary value with a physical address for each motor without reference to the bus address (54); and mapping each bus address to the physical address (56). Note that in some embodiments, the method 50 may be used for other devices (e.g., other than motors).

Any process descriptions or blocks in flow diagrams should be understood as representing steps and/or modules, segments, or portions of code which include one or more executable instructions for implementing specific logical functions or steps in the process, and alternate implementations are included within the scope of the embodiments in which functions may be executed out of order from that shown or discussed, including substantially concurrently, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. An electric motor addressing method for a planter implement comprising:
   receiving, at an electronic control unit (ECU), an address claim request from each motor of a plurality of motors coupled to the ECU via a first bus, each address claim request comprising a requested bus address and a binary value corresponding to a pin connector setting associated with a harness connector of the respective motor;
   associating the binary value with a physical address for each motor without reference to the bus address; and
   mapping each bus address to the physical address.

2. The method of claim 1, wherein receiving comprises receiving the address claim request over the first bus configured as a controller area network (CAN) bus.

3. The method of claim 1, wherein receiving comprises receiving the address claim request according to a J1939 address claim.

4. The method of claim 3, wherein receiving comprises receiving the address claim request configured with a data field comprising a function instance and ECU instance data field.

5. The method of claim 4, wherein the address claim request comprises a plurality of data fields, wherein one of the plurality of data fields comprises the data field.

6. The method of claim 1, further comprising:
   subsequent to the mapping, receiving a second address claim request from one of the plurality of motors, the second address claim request resulting in a new bus address that is different than a previous bus address for the one of the plurality of motors; and
   mapping the new bus address with the physical address.

7. The method of claim 1, further comprising:
   subsequent to the mapping, receiving a third address claim request from one of the plurality of motors that has been moved subsequent to the mapping to a different harness connector, the third address claim request including the binary value for the different harness connector;
   mapping a new bus address for the one of the plurality of motors with the physical address of the different harness connector.

8. The method of claim 1, wherein the bus address is arbitrated among the plurality of motors without reference to the binary value.

9. The method of claim 1, further comprising:
   receiving information from a terminal via a second bus;
   determining a parameter based on the information; and
   providing a signal to one or more of the plurality of motors according to the parameter.

10. The method of claim 9, wherein receiving the information comprises receiving the information over the second bus configured as a controller area network (CAN) bus.

11. The method of claim 9, wherein the terminal is hosted by a tractor and the ECU is associated with a planter coupled to the tractor.

12. An electric motor addressing system for a planter implement comprising:
   a wire harness comprising a plurality of connectors, each connector comprising a unique pin connector value, the wire harness providing a data bus for data communications;
   a plurality of devices coupled respectively to the plurality of connectors, each device comprising circuitry that can read the respective pin connector value and communicate the respective pin connector value over the data bus;
   an electronic control unit (ECU) coupled to the plurality of devices via the wire harness, wherein the ECU is configured to:
      receive an address claim request over the data bus from at least one of the devices, the address claim request comprising the associated pin connector value and a bus address;
      associate the pin connector value to a physical address of the at least one of the devices;
      map the bus address to the physical address; and
      communicate with the at least one of the devices over the data bus based on the physical address.

13. The system of claim 12, wherein the data bus comprises a controller area network (CAN) bus.

14. The system of claim 12, wherein the address claim request comprises a J1939 address claim.

15. The system of claim 14, wherein the address claim request comprises a plurality of data fields, wherein one of the data fields comprises a function instance and ECU instance data field.

16. The system of claim 12, wherein responsive to receiving a second address claim request from the at least one of the plurality of devices, the ECU is configured to map the new bus address to the physical address.

17. The system of claim 16, wherein the second address claim request is responsive to a change in at least one of a location of the at least one of the devices or a change in power to the at least one of the devices.

18. The system of claim 12, wherein the ECU is configured to receive, associate, and map based on a plurality of address claims from the plurality of devices.

* * * * *